Dec. 3, 1957 G. DAVIS 2,815,048
MOBILE BRUSH CUTTING MACHINE
Filed Dec. 22, 1955 2 Sheets-Sheet 1
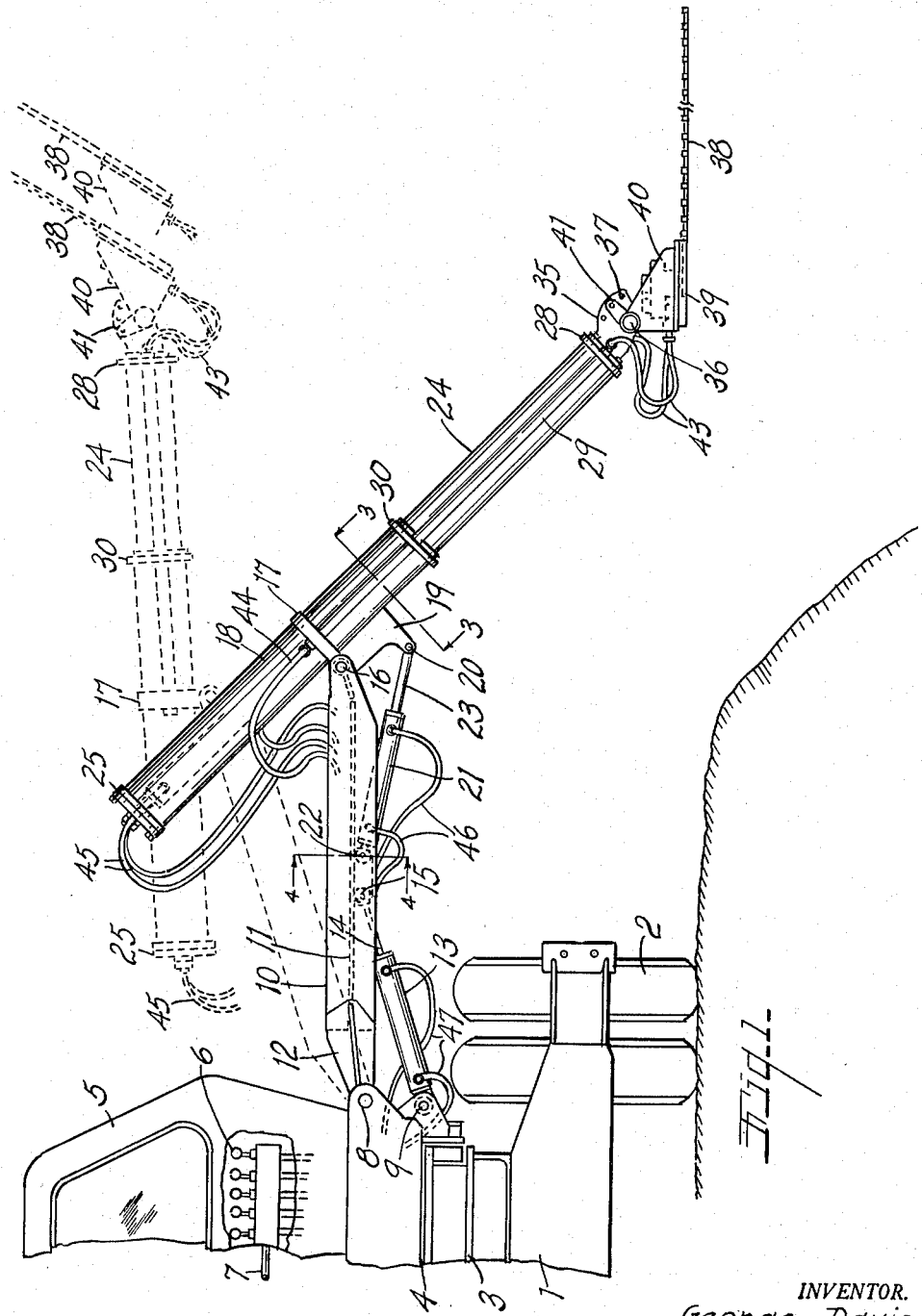
INVENTOR.
George Davis
BY
ATTORNEY.

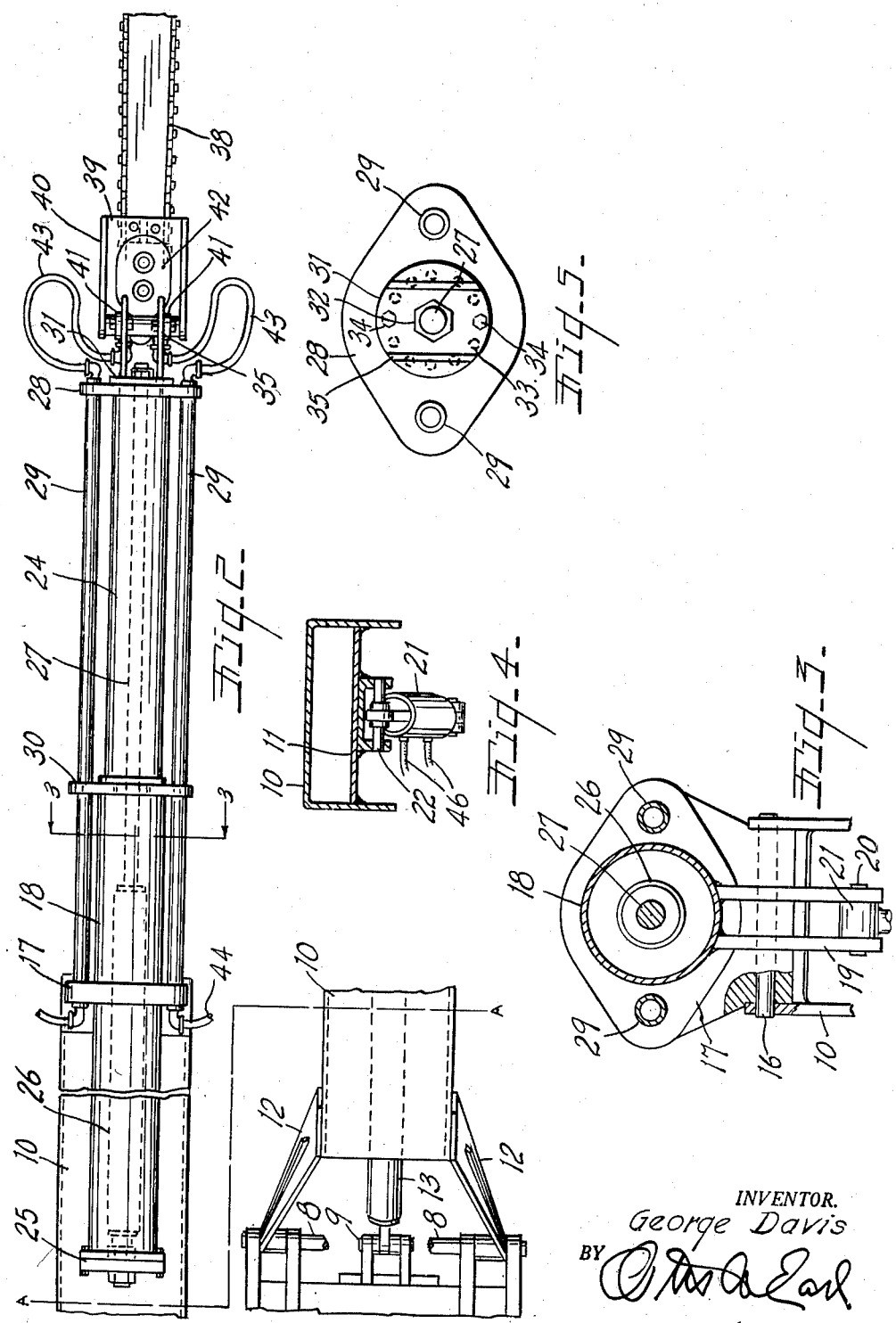

United States Patent Office 2,815,048
Patented Dec. 3, 1957

2,815,048

MOBILE BRUSH CUTTING MACHINE

George Davis, Benton Harbor, Mich., assignor to Davis Engineering Incorporated, Benton Harbor, Mich.

Application December 22, 1955, Serial No. 554,852

12 Claims. (Cl. 143—32)

This invention relates to improvements in mobile brush cutting machine. The principal objects of this invention are:

First, to provide a mobile carriage with a moveably mounted brush trimming implement such as a chain saw with means for moving and adjusting the saw through a wide range of positions so that the saw can be used to trim trees or to trim brush alongside the path of movement of the carriage.

Second, to provide a chain saw support on a mobile carriage which is adjustable to permit the saw to be used to cut brush in ditches along the side of a roadway as the carriage moves along the road.

Third, to provide an adjustable support for a chain saw that is moveable through a wide range of angular adjustments and which is relatively inexpensively assembled from standard mechanical and structural parts.

Other objects and advantages of the invention will be apparent from a consideration of the following description and claims. The drawings, of which there are two sheets, illustrate a highly practical form of the invention.

Fig. 1 is a side elevational view of the saw supporting mechanism connected to a mobile carriage.

Fig. 2 is a top plan view of the saw supporting boom and arm.

Fig. 3 is a transverse cross sectional view taken along the plane of the line 3—3 in Figs. 1 and 2.

Fig. 4 is a transverse cross sectional view taken along the plane of the line 4—4 in Fig. 1.

Fig. 5 is an end elevational view of the saw supporting arm and head with the saw removed.

The machine of the present invention is particularly designed for trimming trees in orchards and for trimming trees and brush along roadways. Provision is made for controlling the position and operation of a trimming saw from a mobile carriage so that the operator can control a continuous operation as the carriage moves forwardly. In Fig. 1 there is illustrated a mobile carriage 1 having road wheels 2 and a base 3 for a turntable 4. The carriage may be self-propelled or towed by any suitable means. Mounted on the turntable 4 is an operator's cab 5 having a plurality of hydraulic control valves 6 therein. The pipe 7 represents a source of hydraulic fluid under pressure which may come from an engine and pump (not illustrated) mounted on the turntable or on another portion of the carriage.

The turntable is provided with vertically spaced upper and lower horizontal pivots 8 and 9 respectively. The pivot 8 swingingly supports a boom 10 consisting of a downwardly facing channel with a reinforcing plate 11 welded along the centers of the flanges of the channel. Plates 12 welded to the inner end of the channel connect the boom to the pivot 8. A hydraulic ram has its cylinder 13 pivotally connected to the pivot 9 and its piston 14 pivotally connected at 15 to an intermediate portion of the boom 10 to raise and lower the boom.

The outer end of the boom 10 carries a transverse pivot 16 and the pivot 16 projects through the lower portion of a collar plate 17. The plate 17 is positioned around and fixedly secured to an intermediate portion of a tubular arm 18. Laterally spaced bracket plates 19 welded to the bottom of the arm and outwardly from the collar plate 17 support a further pivot 20. A second hydraulic ram has its cylinder 21 pivotally connected to the boom at 22 and has its piston 23 connected to the pivot 20 on the bracket plates to swing the tubular arm 18 about the pivot 16.

Telescopically slideably mounted in the tubular arm 18 is a tubular column 24 that projects from the outer end of the arm. The inner end of the tubular arm 18 carries an end plate 25 to which the cylinder 26 of a hydraulic ram is fixedly connected. The cylinder 26 and its piston 27 extend telescopically through the tubular arm 18 and the column 24. The outer end of the column 24 has an end plate 28 to which the piston 27 is fixedly connected to control the length of the combined arm 18 and column 24. The end plate 28 projects beyond the sides of the column 24 and has two pipes 29 secured thereto and extended rearwardly in slidable relation through the sides of the collar plate 17 on the tubular arm. A second collar 30 on the outer end of the tubular arm also slideably passes the pipes 29 and the collars 17 and 30 coact with the pipes 29 to prevent rotation of the tubular column 24 within the tubular arm 18.

Adjustably secured to the outer end of the column 24 is a tool supporting head having a flat end plate 31 rotatably mounted around the end of the piston 27 and clamped against the end plate 28 by the nut 32. The end plate 28 has a circular series of tapped holes 33 therein which selectively receive cap screws 34 to clamp the head plate 31 in a variety of angularly adjusted positions on the end plate 28. The head plate 31 has a pair of transversely spaced outwardly projecting plates 35 which support a pivot 36 in transverse intersecting relation to the axis of the column 24. The plates 35 also have a series of arcuately arranged anchor holes 37 formed therein.

The chain saw conventionally illustrated at 38 is mounted on a base 39 having upstanding flanges 40 that receive the pivot 36 on the tool head. Arms 41 on the flanges 40 underlie the holes 37 and are adapted to be pinned thereto in angularly adjusted positions of the saw 38 with respect to the pivot 36.

The saw 38 is provided with a hydraulic motor 42 mounted on the base 39 and flexible conduits 43 connect the hydraulic connections to the motor to the outer ends of the previously described pipes 29. The inner ends of the pipes 29 are connected by flexible conduits 44 to the controls 6 with the conduits 44 being carried along the boom 10 as will be understood. Other flexible conduits 45 extend from the cylinder 26 along the boom 10 to the controls and still further flexible conduits 46 and 47 connect the cylinders 13 and 21 to the controls.

By means of the structure and connections described the operator is able to swing and incline the boom 10 and column 24 to any desired position between upwardly and downwardly inclined positions of the column. The column can then be extended or retracted through a relatively wide range of movement to bring the tool support head 35 into proximity with the work to be done. The tool head and the saw can be angularly adjusted on the column 24 for the most convenient angle of the saw for any particular trimming operation after which the position of the saw is controlled quickly by the operator as desired to conform with the surface of the work to be trimmed and the movement of the carriage past the work.

Having thus described the invention, what is claimed as new and is desired to be secured by Letters Patent is:

1. A mobile brush trimmer comprising a carriage having a turntable thereon with a source of hydraulic fluid under pressure and control valves therefor on the turntable, a boom pivoted on said turntable to swing in a vertical plane, a tubular arm pivotally supported intermediate of its ends on the swinging end of said boom to swing in the plane of the boom, hydraulic rams having their cylinders and pistons extensibly connected from said boom to said turntable and to said arm, a tubular column telescopically slideably mounted in said arm and projecting from the outer end thereof, an end plate on the outer end of said column, a hydraulic ram having its cylinder and piston extensibly connected between the inner end of said arm and said end plate on said column, axially spaced collars secured to the outside of said arm, one of said collars having the pivot between the arm and boom mounted therein, pipes secured to said end plate and extending slideably through said collars to prevent rotation of said column in said arm, a tool head rotatably mounted over the end of the piston of said last hydraulic ram and against said end plate, means selectively clamping said head in angularly adjusted position on said end plate, a pivot on said head positioned perpendicularly and transversely to the axis of adjustment of said head, a chain saw having a base swingably mounted on said last pivot, means selectively clamping said base in angularly adjusted position on said head, a hydraulic motor on said base connected to drive said saw, flexible conduits connecting said motor to the ends of said pipes, other flexible conduits connected to the inner ends of said pipes and extending along said boom to said controls, still other flexible conduits connected to the cylinder of the ram in said arm and extending along said boom to said controls, and flexible conduits connecting the cylinders of the rams connected to the boom to said controls.

2. A mobile brush trimmer comprising a carriage having a turntable thereon with a source of hydraulic fluid under pressure and control valves therefor on the turntable, a boom pivoted on said turntable to swing in a vertical plane, a tubular arm pivotally supported intermediate of its ends on the swinging end of said boom to swing in the plane of the boom, hydraulic rams having their cylinders and pistons extensibly connected from said boom to said turntable and to said arm, a tubular column telescopically slideably mounted in said arm and projecting from the outer end thereof, an end plate on the outer end of said column, a hydraulic ram having its cylinder and piston extensibly connected between said arm and said column, axially spaced collars secured to the outside of said arm, pipes secured to said end plate and extending slideably through said collars to prevent rotation of said column in said arm, a tool head rotatably mounted against said end plate, means selectively clamping said head in angularly adjusted position on said end plate, a pivot on said head positioned transversely to the axis of adjustment of said head, a chain saw having a base swingably mounted on said last pivot, means selectively clamping said base in angularly adjusted position on said head, a hydraulic motor on said base connected to drive said saw, flexible conduits connecting said motor to the ends of said pipes, other flexible conduits connected to the inner ends of said pipes and extending along said boom to said controls, still other flexible conduits connected to the cylinder of the ram in said arm and extending along said boom to said controls, and flexible conduits connecting the cylinders of the rams connected to the boom to said controls.

3. A mobile brush trimmer comprising a carriage having a turntable thereon with a source of hydraulic fluid under pressure and control valves therefor on the turntable, a boom pivoted on said turntable to swing in a vertical plane, a tubular arm pivotally supported intermediate of its ends on the swinging end of said boom to swing in the plane of the boom, hydraulic rams having their cylinders and pistons extensibly connected from said boom to said turntable and to said arm, a tubular column telescopically slideably mounted in said arm and projecting from the outer end thereof, an end plate on the outer end of said column, a hydraulic ram having its cylinder and piston extensibly connected between the inner end of said arm and said end plate on said column, means engaged between said column and said arm to prevent rotation of said column in said arm, a tool head rotatably mounted against said end plate, means selectively clamping said head in angularly adjusted position on said end plate, a pivot on said head positioned transversely to the axis of adjustment of said head, a chain saw having a base swingably mounted on said last pivot, means selectively clamping said base in angularly adjusted position on said head, a hydraulic motor on said base connected to drive said saw, flexible conduits connecting said motor to the ends of other conduits extending along said boom to said controls, still other flexible conduits connected to the cylinder of the ram in said arm and extending along said boom to said controls, and flexible conduits connecting the cylinders of the rams connected to the boom to said controls.

4. A mobile brush trimmer comprising a carriage having a turntable thereon with a source of hydraulic fluid under pressure and control valves therefor on the turntable, a boom pivoted on said turntable to swing in a vertical plane, a tubular arm pivotally supported intermediate of its ends on the swinging end of said boom to swing in the plane of the boom, hydraulic rams having their cylinders and pistons extensibly connected from said boom to said turntable and to said arm, a tubular column telescopically slideably mounted in said arm and projecting from the outer end thereof, an end plate on the outer end of said column, a hydraulic ram having its cylinder and piston extensibly connected betweeen the inner end of said arm and said end plate on said column, means engaged between said column and said arm to prevent rotation of said column in said arm, a tool head mounted against said end plate, a pivot on said head, a chain saw having a base swingably mounted on said last pivot, means selectively clamping said base in angularly adjusted position on said head, a hydraulic motor on said base connected to drive said saw, flexible conduits connecting said motor to the ends of other conduits extending along said boom to said controls, still other flexible conduits connected to the cylinder of the ram in said arm and extending along said boom to said controls, and flexible conduits connecting the cylinders of the rams connected to the boom to said controls.

5. A mobile brush trimmer comprising a carriage having a turntable thereon with a source of hydraulic fluid under pressure and control valves therefor on the turntable, a boom pivoted on said turntable to swing in a vertical plane, a tubular arm pivotally supported intermediate of its ends on the swinging end of said boom to swing in the plane of the boom, hydraulic rams having their cylinders and pistons extensibly connected from said boom to said turntable and to said arm, a tubular column telescopically slideably mounted on said arm and projecting from the outer end thereof, a hydraulic ram having its cylinder and piston extensibly connected between the inner end of said arm and the outer end of said column, means engaged between said column and said arm to prevent rotation of said column in said arm, a tool head rotatably mounted on the outer end of said column, means selectively clamping said head in angularly adjusted position on said column, a pivot on said head positioned transversely to the axis of adjustment of said head, a chain saw having a base swingably mounted on said last pivot, means selectively clamping said base in angularly adjusted position on said head, a hydraulic motor on said base connected to drive said saw, flexible conduits connected to said motor and extending along said boom to said controls, other flexible conduits connected to the cylinder of the ram in said arm and extending along said boom to said controls, and flexible conduits connecting the cylinders of the rams connected to the boom to said controls.

6. A mobile brush trimmer comprising a carriage having a turntable thereon with a source of hydraulic fluid under pressure and control valves therefor on the turntable, a boom pivoted on said turntable to swing in a vertical plane, a tubular arm pivotally supported intermediate of its ends on the swinging end of said boom to swing in the plane of the boom, hydraulic rams having their cylinders and pistons extensibly connected from said boom to said turntable and to said arm, a tubular column telescopically slideably mounted on said arm and projecting from the outer end thereof, a hydraulic ram having its cylinder and piston extensibly connected between the inner end of said arm and the outer end of said column, means engaged between said column and said arm to prevent rotation of said column in said arm, a tool head mounted on the outer end of said column, a pivot on said head positioned transversely to the axis of said column, a chain saw having a base swingably mounted on said last pivot, means selectively clamping said base in angularly adjusted position on said head, a hydraulic motor on said base connected to drive said saw, flexible conduits connected to said motor and extending along said boom to said controls, other flexible conduits connected to the cylinder of the ram in said arm and extending along said boom to said controls, and flexible conduits connecting the cylinders of the rams connected to the boom to said controls.

7. A mobile brush trimmer comprising a carriage having a turntable thereon with a source of hydraulic fluid under pressure and control valves therefor on the turntable, a boom pivoted on said turntable to swing in a vertical plane, a tubular arm pivotally supported intermediate of its ends on the swinging end of said boom to swing in the plane of the boom, hydraulic rams having their cylinders and pistons extensibly connected from said boom to said turntable and to said arm, a tubular column telescopically slideably mounted on said arm and projecting from the outer end thereof, a hydraulic ram having its cylinder and piston extensibly connected between said arm and said column, means connected to prevent rotation of said column on said arm, a tool head rotatably mounted on the end of said column, means selectively clamping said head in angularly adjusted position on said column, a chain saw having a base mounted on said head, a hydraulic motor on said base connected to drive said saw, flexible conduits connecting said motor to said controls, other flexible conduits connected to the cylinder of the ram in said arm and extending along said boom to said controls, and flexible conduits connecting the cylinders of the rams connected to the boom to said controls.

8. A mobile brush trimmer comprising a carriage having a turntable thereon with a source of hydraulic fluid under pressure and control valves therefor on the turntable, a boom pivoted on said turntable to swing in vertical plane, a tubular arm pivotally supported intermediate of its ends on the swinging end of said boom to swing in the plane of the boom, hydraulic rams having their cylinders and pistons extensibly connected from said boom to said turntable and to said arm, a tubular column telescopically slideably mounted on said arm and projecting from the outer end thereof, a hydraulic ram having its cylinder and piston extensibly connected between said arm and said column, means connected to prevent rotation of said column on said arm, a tool head mounted on the end of said column, a chain saw having a base mounted on said head, a hydraulic motor on said base connected to drive said saw, flexible conduits connecting said motor to said controls, other flexible conduits connected to the cylinder of the ram in said arm and extending along said boom to said controls, and flexible conduits connecting the cylinders of the rams connected to the boom to said controls.

9. A mobile brush trimmer comprising a carriage having a turntable thereon with a source of hydraulic fluid under pressure and control valves therefor on the turntable, a boom pivoted on said turntable to swing in a vertical plane, an arm pivotally supported intermediate of its ends on the swinging end of said boom to swing in the plane of the boom, hydraulic rams having their cylinders and pistons extensibly connected from said boom to said turntable and to said arm, a column longitudinally slideably and non-rotatably mounted on said arm and projecting from the outer end thereof, a hydraulic ram having its cylinder and piston extensibly connected between said arm and said column, a tool head rotatably mounted against the end of said column, means selectively clamping said head in angularly adjusted position on said column, a pivot on said head positioned transversely to the axis of adjustment of said head, a chain saw having a base swingably mounted on said last pivot, means selectively clamping said base in angularly adjusted position on said head, a hydraulic motor on said base connected to drive said saw, flexible conduits connecting said motor to the said controls, other flexible conduits connected to the cylinder of the ram on said arm and extending along said boom to said controls, and flexible conduits connecting the cylinders of the rams connected to the boom to said controls.

10. A mobile brush trimmer comprising a carriage having a turntable thereon with a source of hydraulic fluid under pressure and control valves therefor on the turntable, a boom pivoted on said turntable to swing in a vertical plane, an arm pivotally supported intermediate of its ends on the swinging end of said boom to swing in the plane of the boom, hydraulic rams having their cylinders and pistons extensibly connected from said boom to said turntable and to said arm, a column longitudinally slideably and non-rotatably mounted on said arm and projecting from the outer end thereof, a hydraulic ram having its cylinder and piston extensibly connected between said arm and said column, a chain saw having a base swingably mounted on the end of said column, means selectively clamping said base in angularly adjusted position on said column, a hydraulic motor on said base connected to drive said saw, flexible conduits connecting said motor to the said controls, other flexible conduits connected to the cylinder of the ram on said arm and extending along said boom to said controls, and flexible conduits connecting the cylinders of the rams connected to the boom to said controls.

11. In a mobile brush trimming machine, a power driven cutter having a base, a pivotal support for said base, means adjustably clamping said base with respect to said support, a column supporting said support for rotation about an axis transverse to said pivot, means adjustably clamping said support to said column, an arm slideably supporting said column for movement longitudinally of the arm and column, a hydraulic ram connected to move said column on said arm, a boom having its outer end pivotally connected to an intermediate portion of said arm, a second hydraulic ram connected to swing said arm about its pivot on said boom, a turntable having a horizontal pivot thereon to which the inner end of said boom is connected, a third hydraulic ram connected between said boom and said turntable to raise and lower said boom, a mobile carriage rotatably supporting said turntable, a source of power on said turntable, and selectively controllable means connecting said power source to said rams and said cutter.

12. In a mobile brush trimming machine, a power driven cutter having a base, a support for said base, a column supporting said support, an arm slideably supporting said column for movement longitudinally of the arm and column, a hydraulic ram connected to move said column on said arm, a boom having its outer end pivotally connected to said arm, a second hydraulic ram connected to swing said arm about its pivot on said boom, a turntable having a horizontal pivot thereon to which the inner end of said boom is connected, a third hydraulic ram connected between said boom and said turntable to raise and lower said boom, a mobile carriage rotatably supporting said turntable, a source of power on said turntable, and selectively controllable means connecting said power source to said rams and said cutter.

References Cited in the file of this patent

UNITED STATES PATENTS

| | | |
|---|---|---|
| 906,714 | Hoovestol | Dec. 15, 1908 |
| 1,602,357 | Georgelis | Oct. 5, 1926 |
| 2,365,408 | Hillyer | Dec. 19, 1944 |
| 2,579,862 | Richardson | Dec. 25, 1951 |
| 2,588,953 | Bausch et al. | Mar. 11, 1952 |
| 2,733,738 | Block | Feb. 7, 1956 |
| 2,746,492 | De Hardit | May 22, 1956 |

FOREIGN PATENTS

| | | |
|---|---|---|
| 1,063,208 | France | Dec. 16, 1953 |